United States Patent
Yu

(10) Patent No.: US 7,669,924 B2
(45) Date of Patent: Mar. 2, 2010

(54) SADDLE

(75) Inventor: Tsai-Yun Yu, Taichung Hsien (TW)

(73) Assignee: International Bicycle Products Corporation, Taichun Hsien (TW)

( * ) Notice: Subject to any disclaimer, the term of this patent is extended or adjusted under 35 U.S.C. 154(b) by 0 days.

(21) Appl. No.: 12/132,292

(22) Filed: Jun. 3, 2008

(65) Prior Publication Data

US 2009/0108644 A1 Apr. 30, 2009

Related U.S. Application Data

(60) Provisional application No. 60/982,942, filed on Oct. 26, 2007.

(30) Foreign Application Priority Data

Apr. 9, 2008 (TW) .............................. 97112838 A

(51) Int. Cl.
*B62J 1/18* (2006.01)
(52) U.S. Cl. .................................................... 297/214
(58) Field of Classification Search .............. 297/195.1, 297/202, 214, DIG. 1, 440.22, 440.1; 24/453
See application file for complete search history.

(56) References Cited

U.S. PATENT DOCUMENTS

| | | | | |
|---|---|---|---|---|
| 1,900,574 A | * | 3/1933 | Meader | 24/453 |
| 3,388,946 A | * | 6/1968 | Grace | 297/214 |
| 4,103,966 A | * | 8/1978 | Allen | 297/195.1 |
| 5,356,205 A | | 10/1994 | Calvert et al. | |
| 5,714,108 A | * | 2/1998 | Girardi et al. | 264/331.17 |
| 5,918,931 A | * | 7/1999 | Culbertson | 297/202 |
| 6,523,891 B1 | * | 2/2003 | Yates | 297/202 |
| 2004/0195871 A1 | | 10/2004 | Lee | |

FOREIGN PATENT DOCUMENTS

WO WO2007/031943 A1 3/2007

* cited by examiner

*Primary Examiner*—Milton Nelson, Jr.
(74) *Attorney, Agent, or Firm*—Muncy, Geissler, Olds & Lowe, PLLC

(57) ABSTRACT

A saddle with proper deformability is provided. The saddle comprises a base, a pad, and a fastening device adapted to fasten the base and pad together. Therein, the materials of the pad comprise Ethylene-vinyl acetate (EVA). Thereby, the saddle of this invention is adapted to deform appropriately according to the buttocks and the crotches of a cyclist and to absorb the vibration that is experienced during the ride, so that the comfort of the saddle is greatly improved.

13 Claims, 15 Drawing Sheets

SADDLE

This application claims priority to Taiwan Patent Application No. 097112838 filed on Apr. 9, 2008, and U.S. Provisional Application No. 60/982,942 filed oil Oct. 26, 2007, the disclosures of which are incorporated herein by reference in their entirety.

CROSS-REFERENCES TO RELATED APPLICATIONS

Not applicable.

BACKGROUND OF THE INVENTION

1. Field of the Invention

The present invention provides a saddle for a vehicle, in particular a saddle with great comfort for a bicycle.

2. Descriptions of the Related Art

In modern society, people are more and more concerned about recreation and body building. Among various sports, bicycle riding not only has a benefit on fitness, but also helps to relax the mind. Accordingly, as bicycles have become more of a means for recreation and physical exercise rather than merely a transportation tool. As a result, the demands on the bicycle requirements have increased accordingly as well.

When riding a bicycle, the weight of a cyclist is primarily supported by the buttocks. Because of the weight, the area of the buttocks that come into contact with the saddle are put under an extremely high stress. Therefore, if no provisions for alleviating the stress are made on the saddle, the cyclist is less willing to ride the bicycle. Hence, the comfort of the saddle has become an important factor with which people are concerned when making a purchase decision.

When a cyclist rides a bicycle on various road conditions, vibrations arising during the riding process often make the cyclist feels uncomfortable, and this makes it difficult for the cyclist to ride the bicycle in comfort for an extended time. Furthermore, for a commercially available bicycle saddle, a pad made of foam is typically provided on a base that is made of a hard material. However, the pad is generally too soft, so even though it can slightly decrease the stress incurred when the rider sits on the saddle, the buttocks or crotches of the cyclist will still feel uncomfortable due to the pressing action of the hard base. Moreover, some pads made of soft materials fail to deform in response to the different shapes of buttocks and crotches, and even may be gathered in areas where high stress is expected. Furthermore, some racing bicycles or road bicycles adopt pads integrally formed from a hard material, which makes the cyclists feel more uncomfortable. Therefore, the material of the saddle has become an important factor that dominates the riding comfort of the saddle.

In view of this, it is highly desirable in the art to provide a saddle with appropriate deformation and cushioning capabilities.

SUMMARY OF THE INVENTION

One objective of this invention is to provide a saddle with an appropriate deformation and cushioning capabilities to allow the cyclist to sit thereon in comfort.

The saddle of this invention comprises a base, a pad and a fastening device adapted to connect the base with the pad. The saddle of this invention is characterized in that the pad is made of a material comprising ethylene-vinyl acetate (EVA). As a result, the saddle of this invention is able to appropriately deform in response to the buttocks and crotches of different cyclists and absorb vibrations arising during the riding process. This remarkably improves the comfort of the saddle of this invention.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
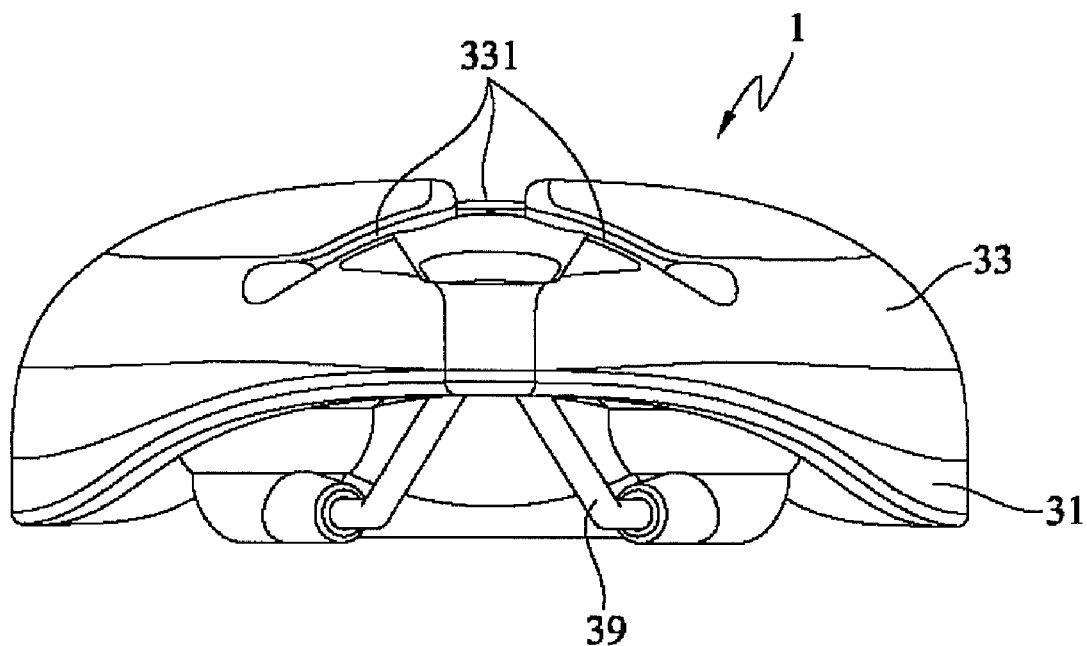
FIG. 1A is a front view of the first embodiment of this invention.
Figure 1B:
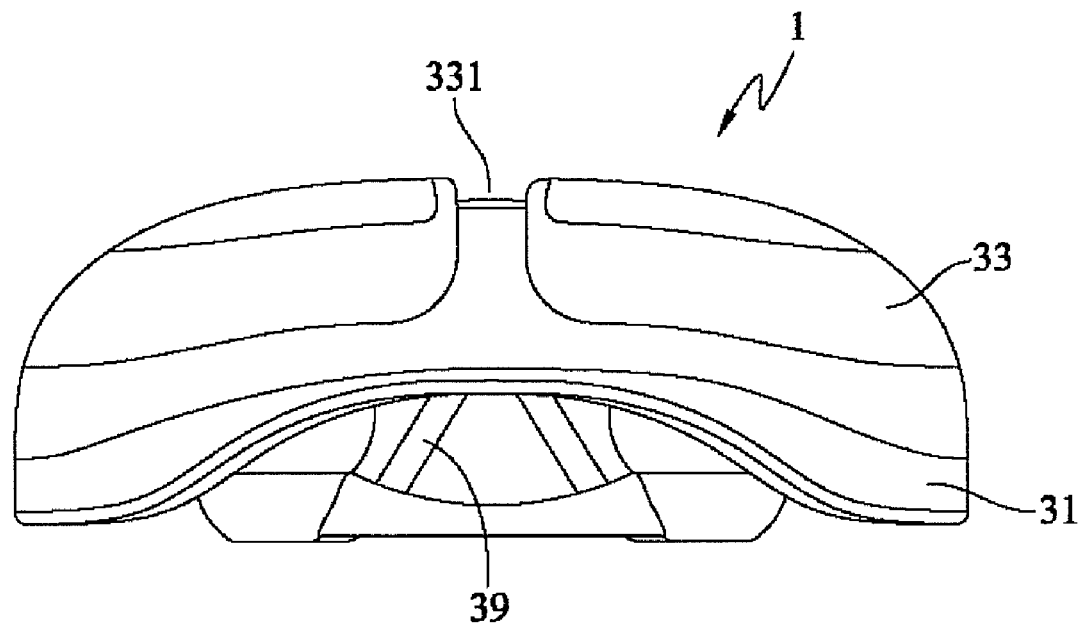
FIG. 1B is a rear view of the first embodiment of this invention.
Figure 1C:
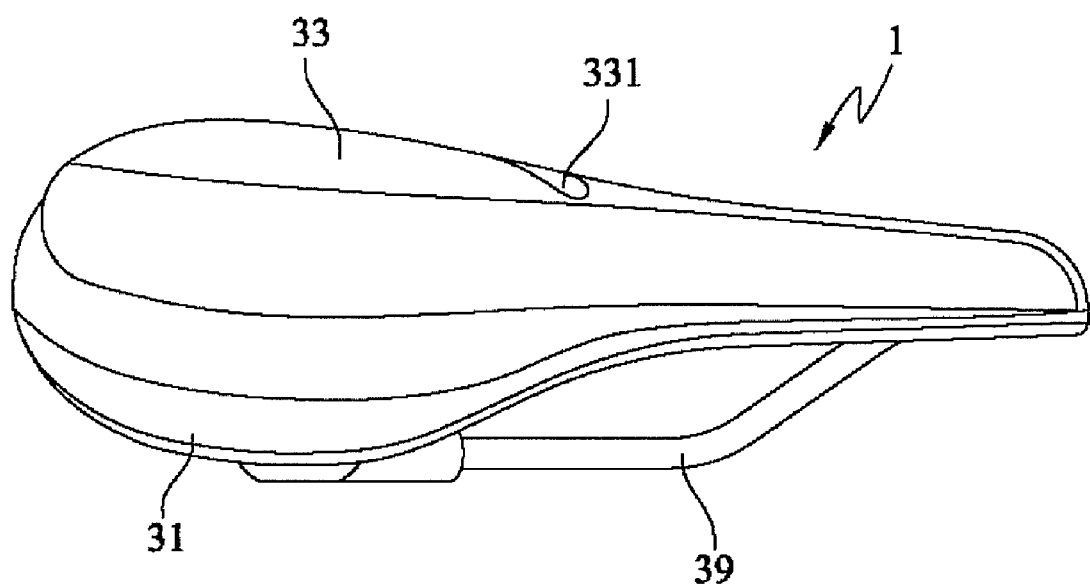
FIG. 1C is a side view of the first embodiment of this invention.
Figure 1D:
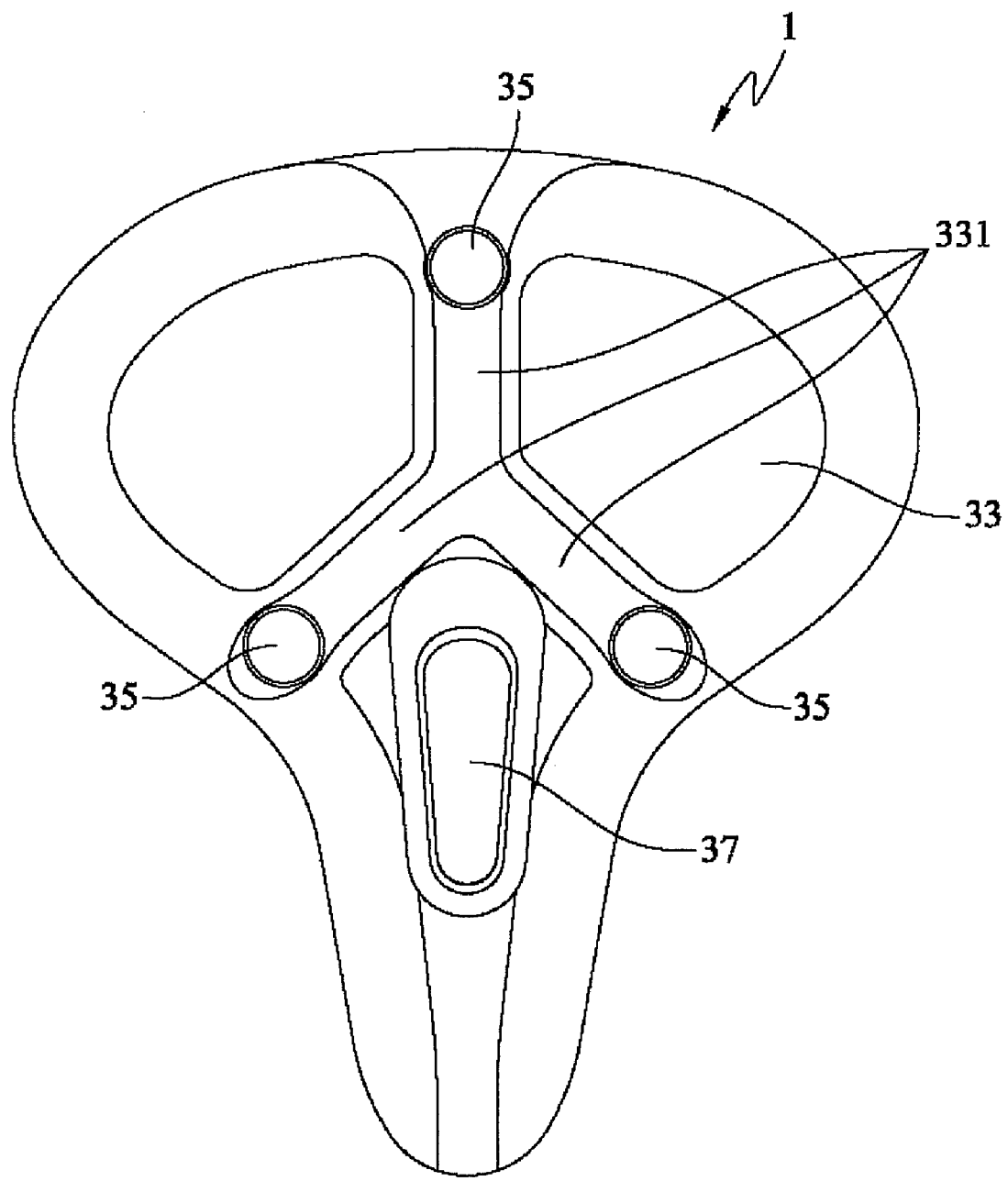
FIG. 1D is a top view of the first embodiment of this invention.
Figure 1E:
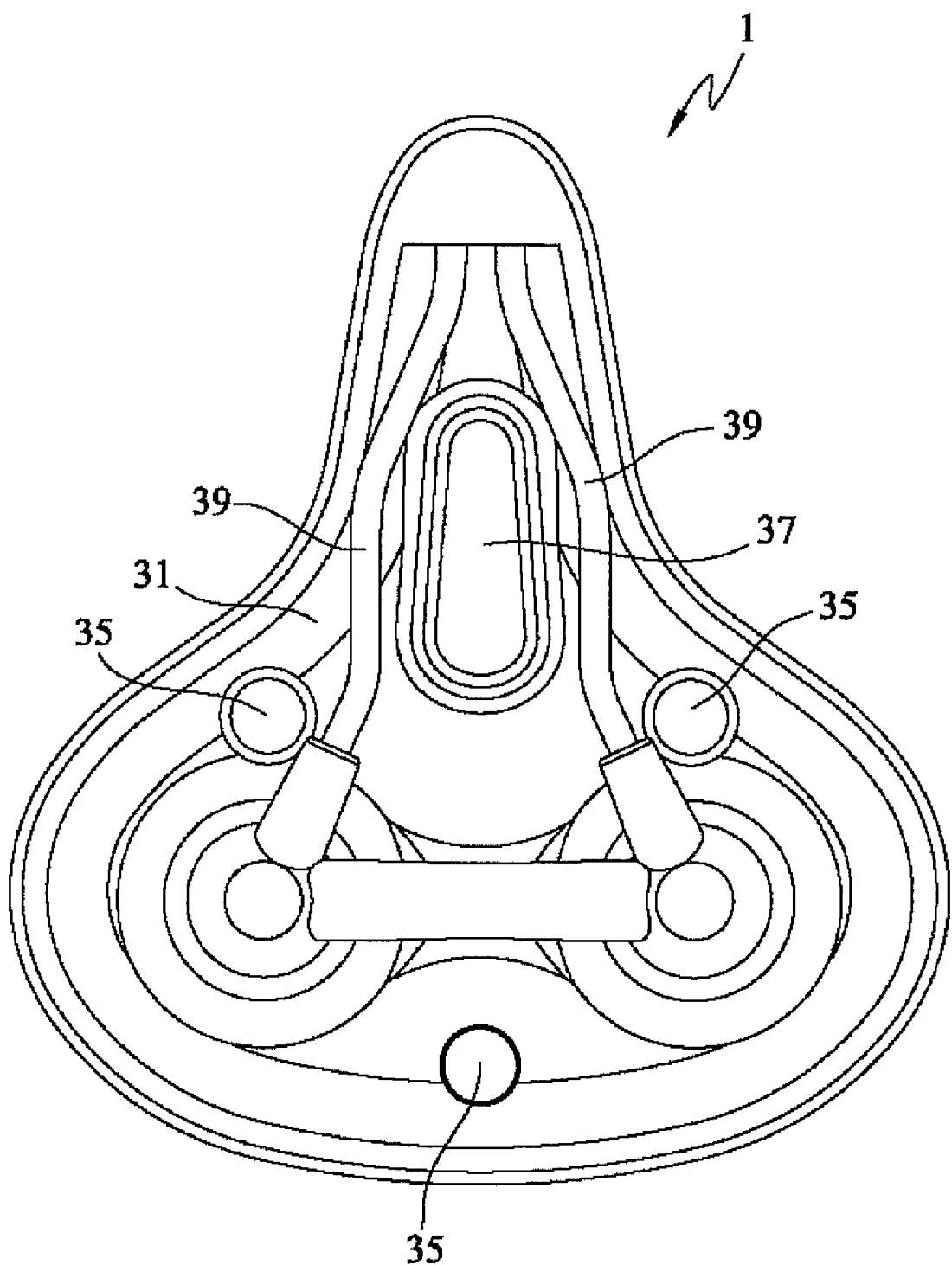
FIG. 1E is a bottom view of the first embodiment of this invention.
Figure 1F:
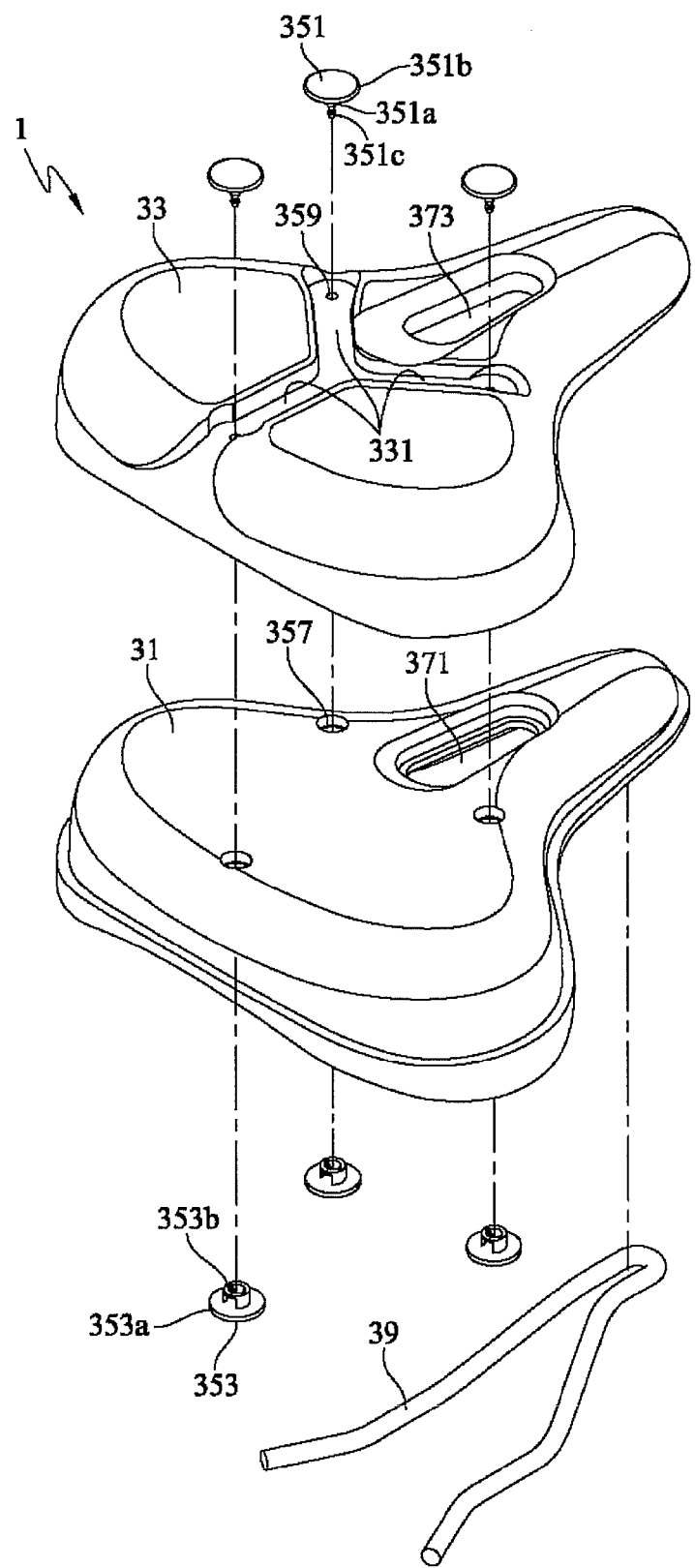
FIG. 1F is an exploded view of the first embodiment of this invention.
Figure 1G:
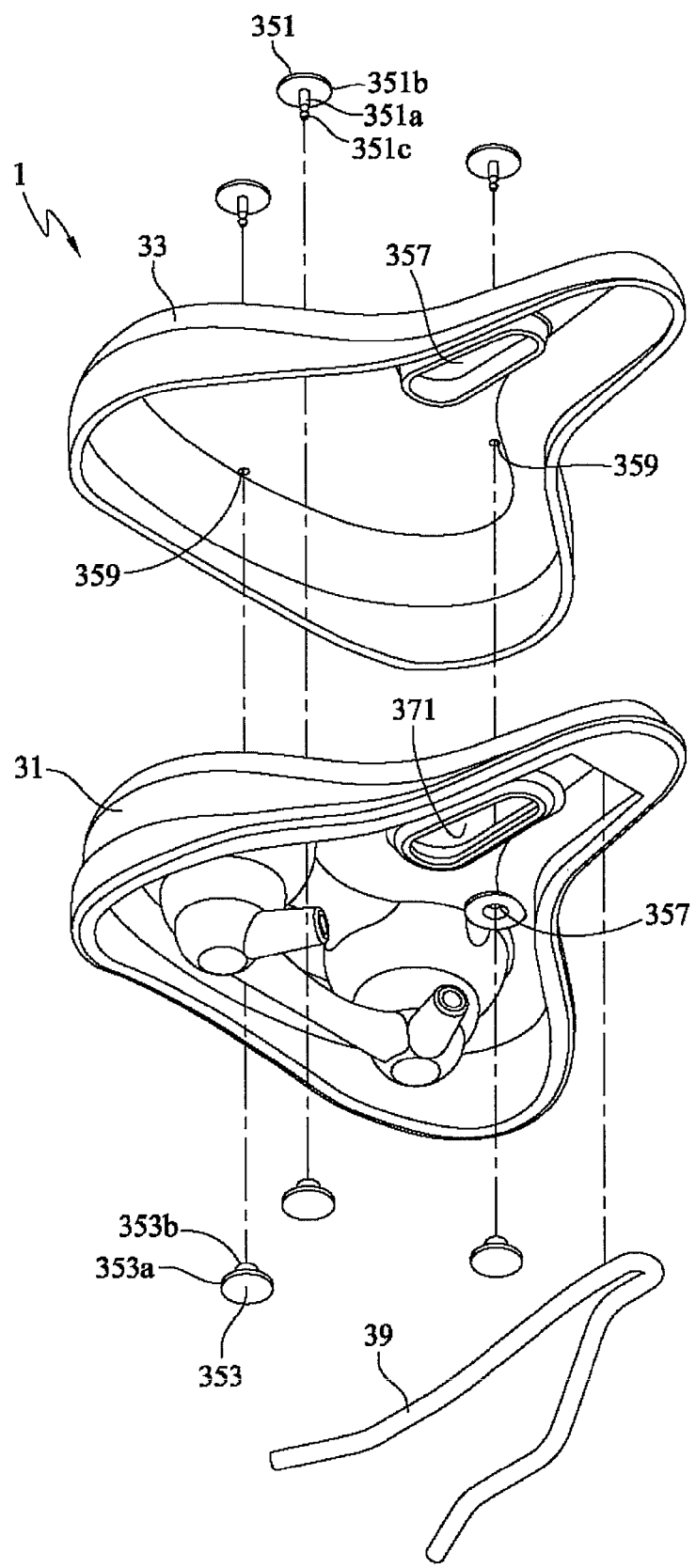
FIG. 1G is an exploded view from another viewing angle of the first embodiment of this invention.
Figure 1H:
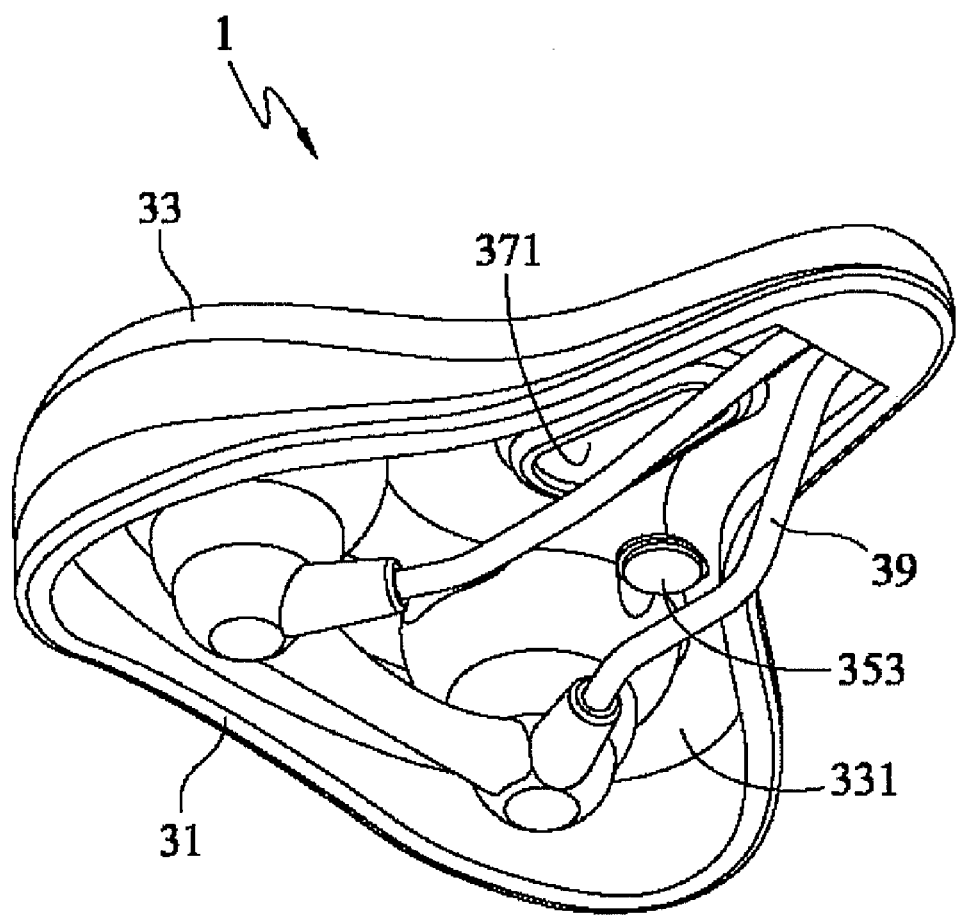
FIG. 1H is a schematic assembled view of the first embodiment of this invention.
Figure 1I:
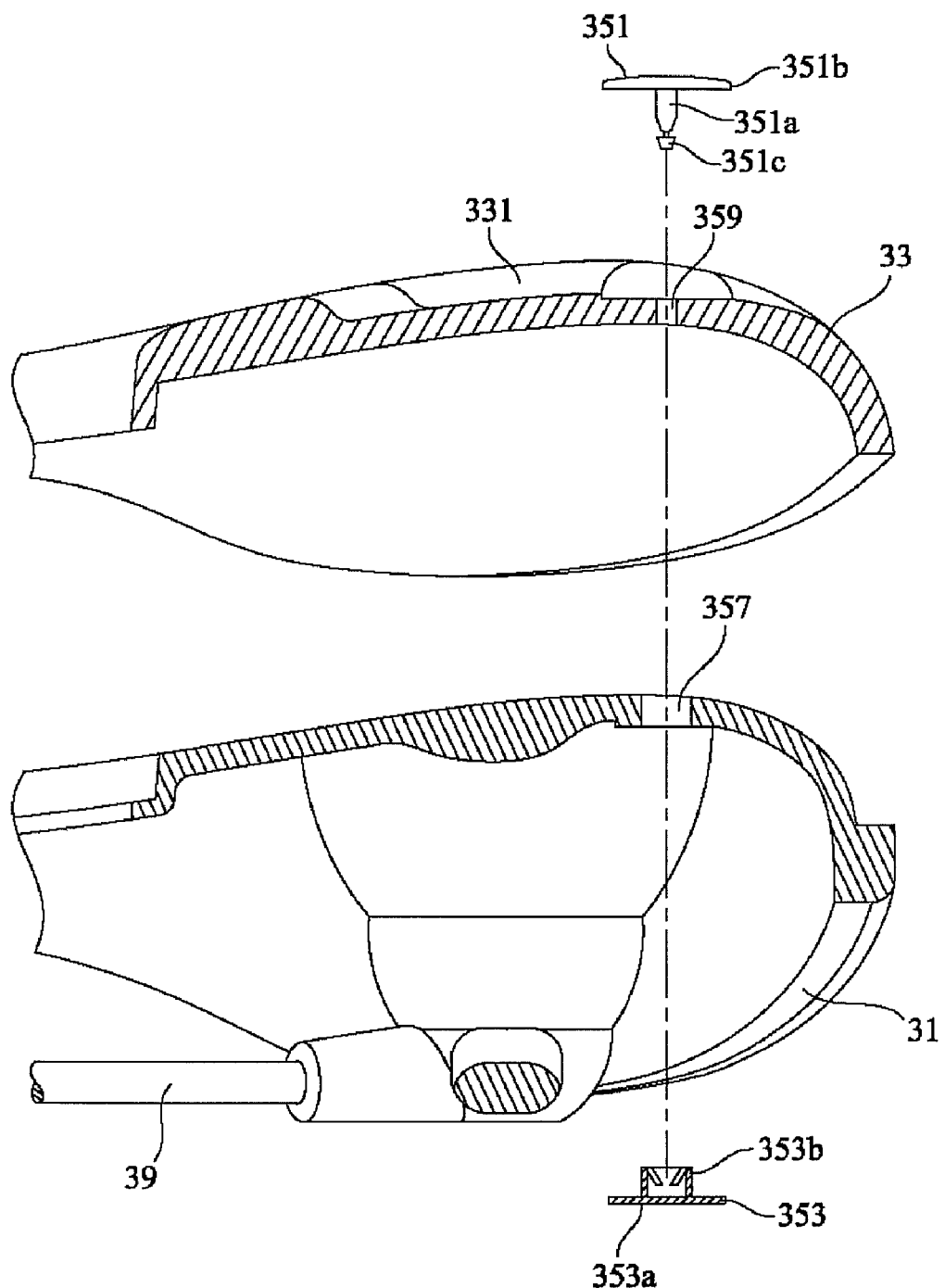
FIG. 1I is a partially cross-sectional exploded view of the first embodiment of this invention.
Figure 1J:
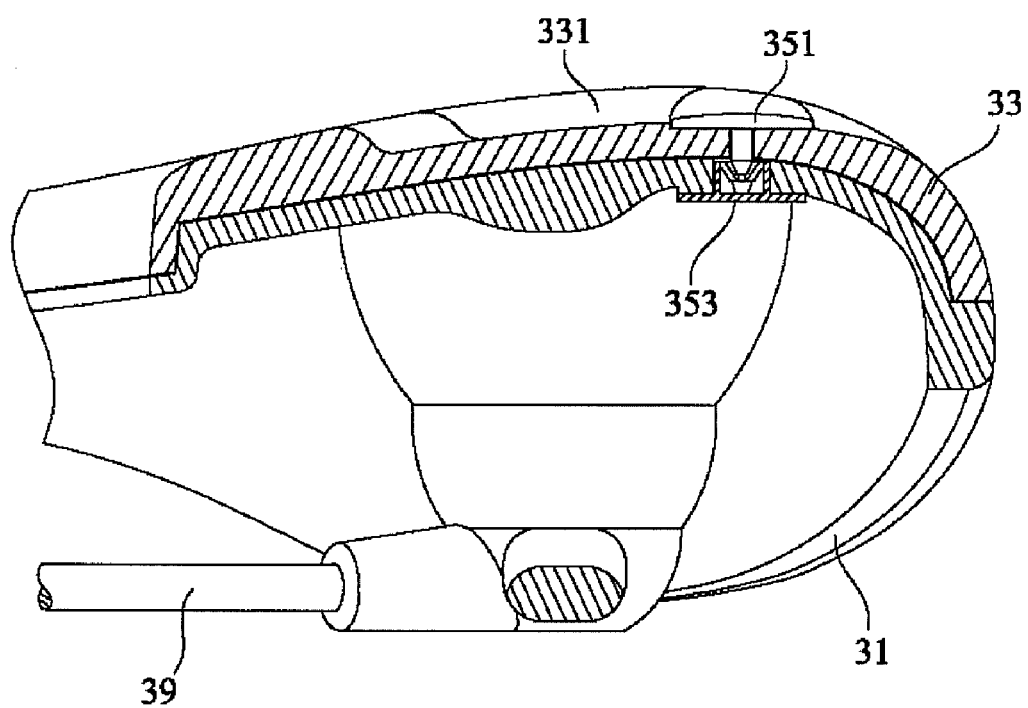
FIG. 1J is a partially cross-sectional assembled view of the first embodiment of this invention.

This invention provides a saddle, which primarily comprises a base, a pad, a fastening device, a vent device and a rail device. The pad is made of a material comprising ethylene-vinyl acetate (EVA). This particular material provides the pad with appropriate deformation and cushioning capabilities as well as an appropriate supporting capability. The EVA material should be foamed to produce the pad 33 to further improve the deformation and cushioning capabilities of the pad 33. It should be noted that the material of the pad may also be a composite formed by the EVA and other materials.

FIGS. 1A to 1J depict a saddle 1 of the first embodiment of this invention. The saddle 1 of this embodiment comprises a base 31, a pad 33, a fastening device 35, a vent device 37 and a rail device 39. The base 31 may be made of a material including a variety of plastics, carbon fibers or the like. As previously described, the pad 33 is primarily made of the EVA, and may also be made of a composite formed by the EVA and other materials.

In this embodiment, the fastening device 35 is adapted to be fixedly connected the base 31 and the pad 33. The fastening device 35 comprises three fastening pins 351, three fastening caps 353, three first through-holes 357 and three second through-holes 359. As depicted in FIGS. 1F to 1J, the first through-holes 357 are dispersedly formed in the base 31. The second through-holes 359 are formed in the pad 33 at locations corresponding to the first through-holes 357 respectively. Each of the fastening pins 351 are inserted through both the first through-hole 357 and the corresponding second through-hole 359 to be interlocked with the corresponding fastening cap 353 to fix the pad 33 onto the base 31.

As depicted in FIGS. 1F, 1G, 1I and 1J, each of the fastening pins 351 comprises a neck portion 351a, a cap portion 351b and a snap fit head 351c. Each of the fastening cap 353 comprises a cap portion 353a and a snap fit hole 353b. When the snap fit head 351c of the fastening pin 351 are engaged into the snap fit hole 353b of the fastening cap 353 to fix the pad 33 onto the base 31, a base portion of the cap portion 351b of the fastening pin 351 abuts against a top surface of the pad 33, a base portion of the cap portion 353a of the fastening caps 353 abuts against a bottom surface of the base 31, and the neck portion 351a of the fastening pin 351 is inserted through the first through-hole 357 and the second through-hole 359. In other words, the base 31 and the pad 33 are adapted to be clamped by the cap portion 351b of the fastening pin 351 and the cap portion 353a of the fastening cap 353.

To improve the air permeability of the saddle 1 and prevent the fastening device 35 from protruding beyond the pad 33, the pad 33 has three grooves 331 on the top surface so the second through-holes 359 in the pad 33 are formed in the corresponding grooves 331 respectively. In this embodiment, each of the grooves 331 has a depth greater than (in other embodiments, may also be equal to) a cap height of each of the fastening pin 351 to prevent the fastening device 35 from protruding beyond the pad 33.

In other examples, the fastening pin 351 may also be inserted through the first through-hole 357 and the second through-hole 359 from a reverse direction to clamp the base 31 and the pad 33 together. In this case, the base portion of the cap portion 351b of the fastening pin 351 abuts against the bottom surface of the base 31, and the base portion of the fastening cap 353 abuts against the top surface of the pad 33. Also, each of the grooves 331 has a depth greater than or equal to a cap height of each of the fastening cap 353. Furthermore, the number of the fastening pins 351, the fastening caps 353, the first through-holes 357, the second through-holes 359 and the grooves 331 is not merely limited to three, but may also be another number. It should be noted that when the number of these elements is different from that of this embodiment, the same objectives can also be accomplished simply by correspondingly designing the relative locations. Therefore, such equivalent modifications shall also fall within the scope of the claims of this invention.

The vent device 37 comprises a first vent 371 and a second vent 373. The first vent 371 is formed on the base 31 and extends from the top surface to the bottom surface of the base 31 to guide air from the bottom surface of the base 31 to the pad 33. The second vent 373 is formed on the pad 33 corresponding to the first vent 371 and extends from the top surface to the bottom surface of the pad 33 to guide air from the bottom surface of the base 31 to the top surface of the pad 33. With such an arrangement, a cyclist can sit on the saddle 1 and ride the bicycle in comfort without the feeling stuffy. It should be noted that although the vent device 37 is used in this embodiment, the vent device may also be eliminated or formed with additional vents in other embodiments to match the requirements in terms of weight, air permeability or the like.

The rail device 39 is located on the bottom surface of the base 31, with which the saddle can be fixedly connected to a bicycle frame via elements, such as seat posts and seat post clamps. The rail device 39 is preferably made of a material selected from a group consisting of magnesium, magnesium alloy, titanium, titanium alloy, nickel and nickel alloy to provide adequate support for the base 31 while still cater for the tendency towards lightweight bicycle parts.

Figure 2A:
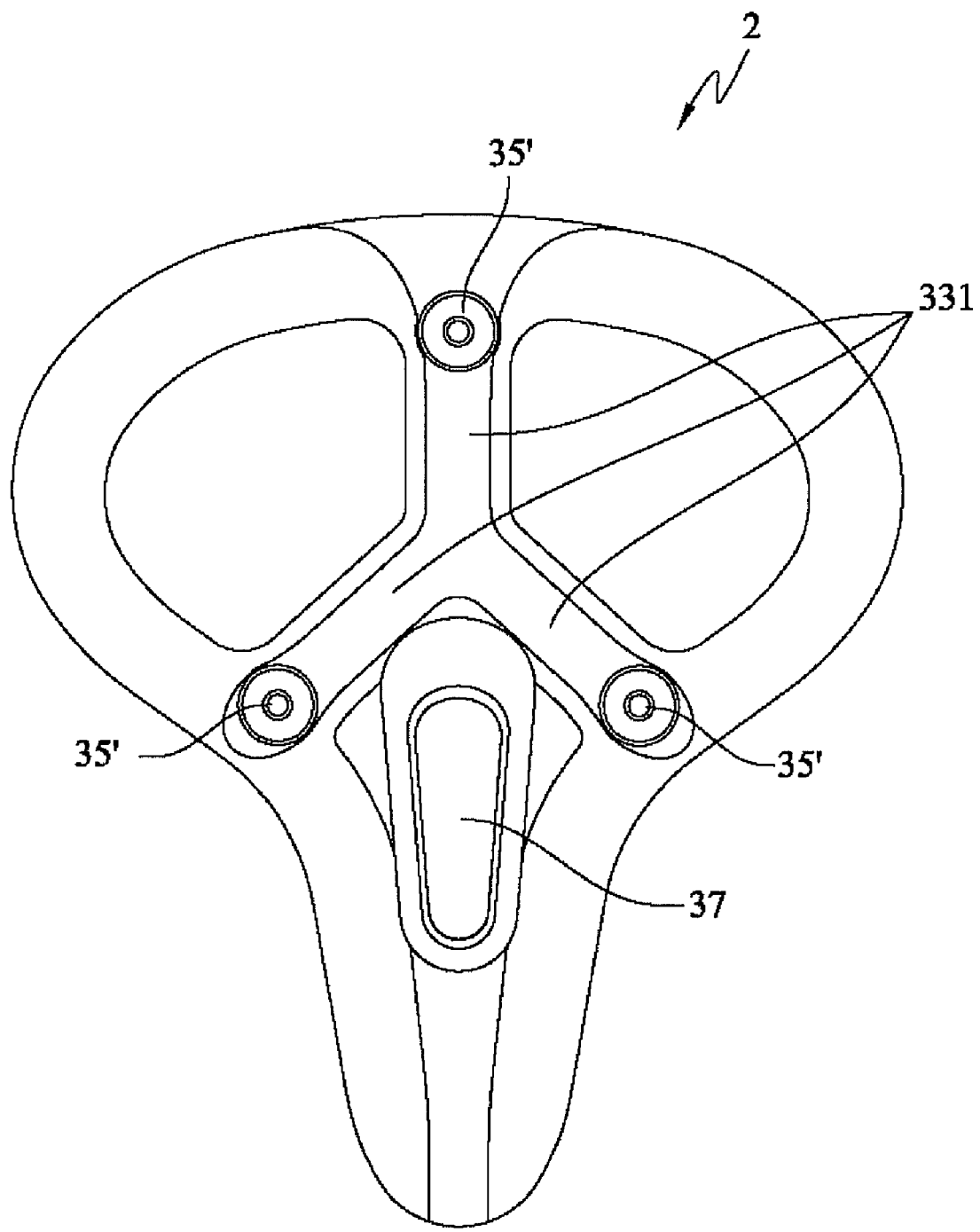
FIG. 2A is a top view of the second embodiment of this invention.
Figure 2B:
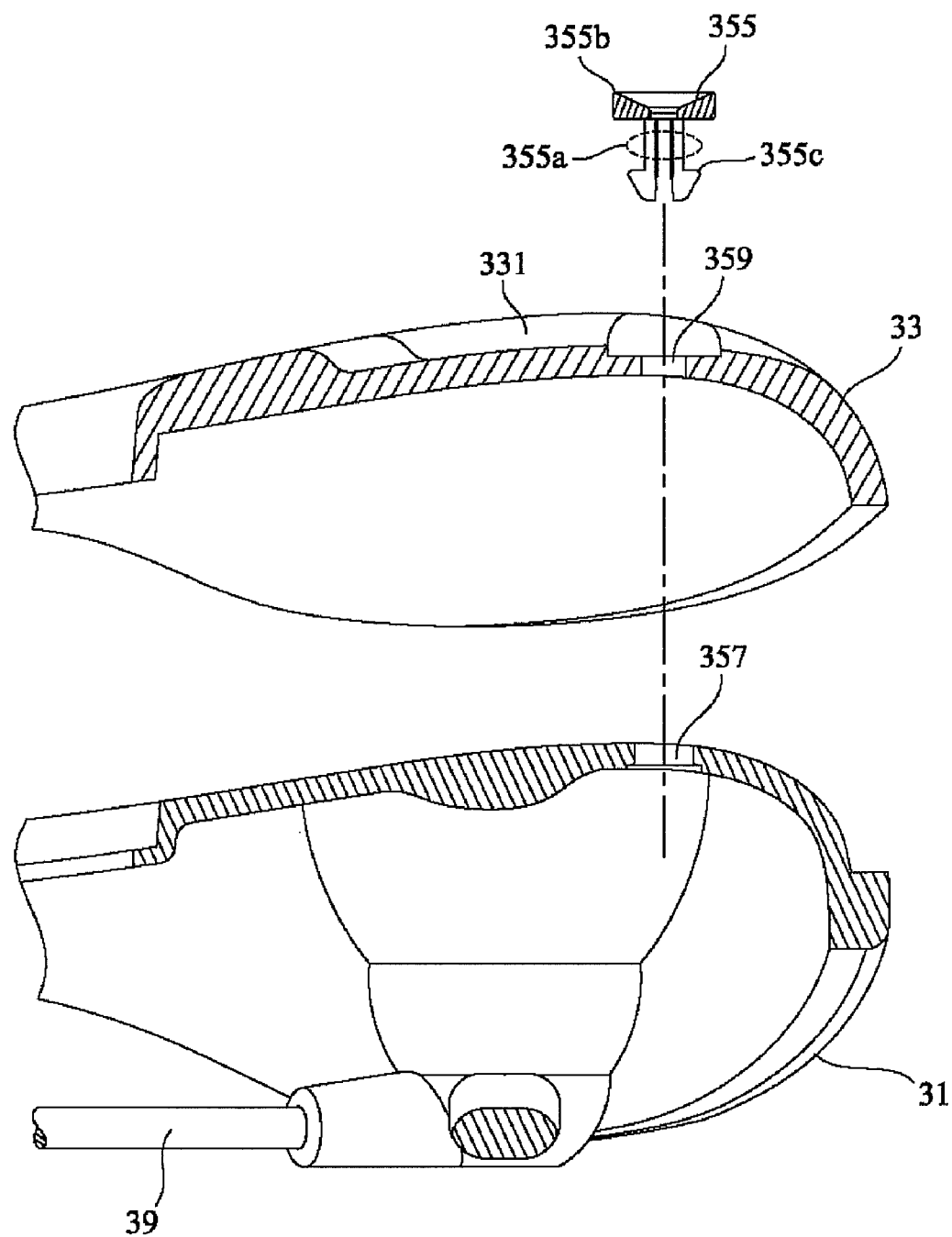
FIG. 2B is a partially cross-sectional exploded view of the second embodiment of this invention.
Figure 2C:
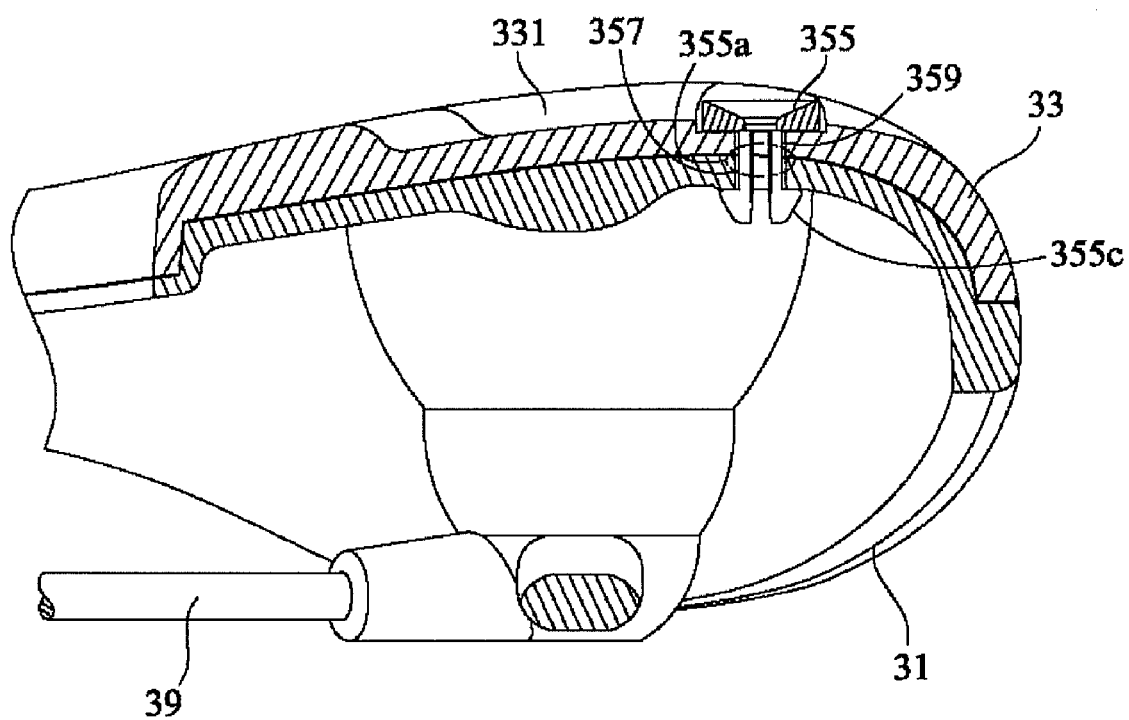
FIG. 2C is a partially cross-sectional assembled view of the second embodiment of this invention.

As shown in FIGS. 2A to 2C, the second embodiment of this invention is depicted therein. A saddle 2 of the second embodiment is similar to the saddle 1 of the first embodiment except that the fastening device 35' fixes the base 31 and the pad 33 together by a different means. In this embodiment, the fastening device 35' also comprises three first through-holes 357 and three second through-holes 359. However, the three fastening pins 351 and the three fastening caps 353 used in the first embodiment are replaced by three cowl fasteners 355, i.e., each of the cowl fasteners 355 is adapted to provide functions similar to a fastening pin 351 in combination with a fastening cap 353.

As shown in FIG. 2A, in the fastening device 35' of this embodiment, the first through-holes 357 are also dispersedly formed in the base 31, and the second through-holes 359 are also formed in the pad 33 at locations corresponding to the first through-holes 357 respectively. The fastening device 35' simply uses the cowl fasteners 355 inserted through both a first through-hole 357 and a corresponding second through-hole 359 respectively to fix the pad 33 onto the base 31.

As depicted in FIGS. 2B and 2C, each of the cowl fasteners 355 comprises a neck portion 355a, a cap portion 355b and a discontinuous conical portion 355c. When the cowl fastener 355 fixes the pad 33 onto the base 31, a base portion of the cap portion 355b of the cowl fastener 355 abuts against a top surface of the pad 33, while a support portion of the discontinuous conical portion 355c of the cowl fastener 355 abuts against the bottom surface of the base 31. Similarly, the neck portion 355a of the cowl fastener 355 is inserted through the first through-hole 357 and the second through-hole 359. In other words, the base 31 and the pad 33 are adapted to be clamped by the cap portion 355b and the discontinuous conical portion 355c of the cowl fastener 355.

In this embodiment, the pad 33 has three grooves 331 on the top surface, so the second through-holes 359 in the pad 33 are formed in the corresponding grooves 331 respectively. In this embodiment, each of the grooves 331 has a depth greater than (in other embodiments, may also be equal to) a cap height of each of the cowl fasteners 355 to prevent the fastening device 35 from protruding beyond the pad 33.

In other examples, the cowl fasteners 355 of this embodiment may also be inserted through the first through-hole 357 and the second through-hole 359 from the reverse direction. In this case, the base portion of the cap portion 355b of the cowl fastener 355 abuts against the bottom surface of the base 31, while the support portion of the discontinuous conical portion 355c of the cowl fastener 355 abuts against the top surface of the pad 33. Also, each of the grooves 331 has a depth greater than or equal to a discontinuous conical height of each of the cowl fasteners 355. Furthermore, the number of the cowl fastener 355, the first through-holes 357, the second through-holes 359 and the grooves 331 is not merely limited to three, but may also be another number. It should be noted that when the number of these elements is different from that of this embodiment, the same objectives can also be accomplished simply by correspondingly designing the relative locations. Therefore, such equivalent modifications shall also fall within the scope of the claims of this invention. Other parts of this embodiment are similar in structure and material to those of the first embodiment, and thus will not be further described again herein.

Figure 3A:
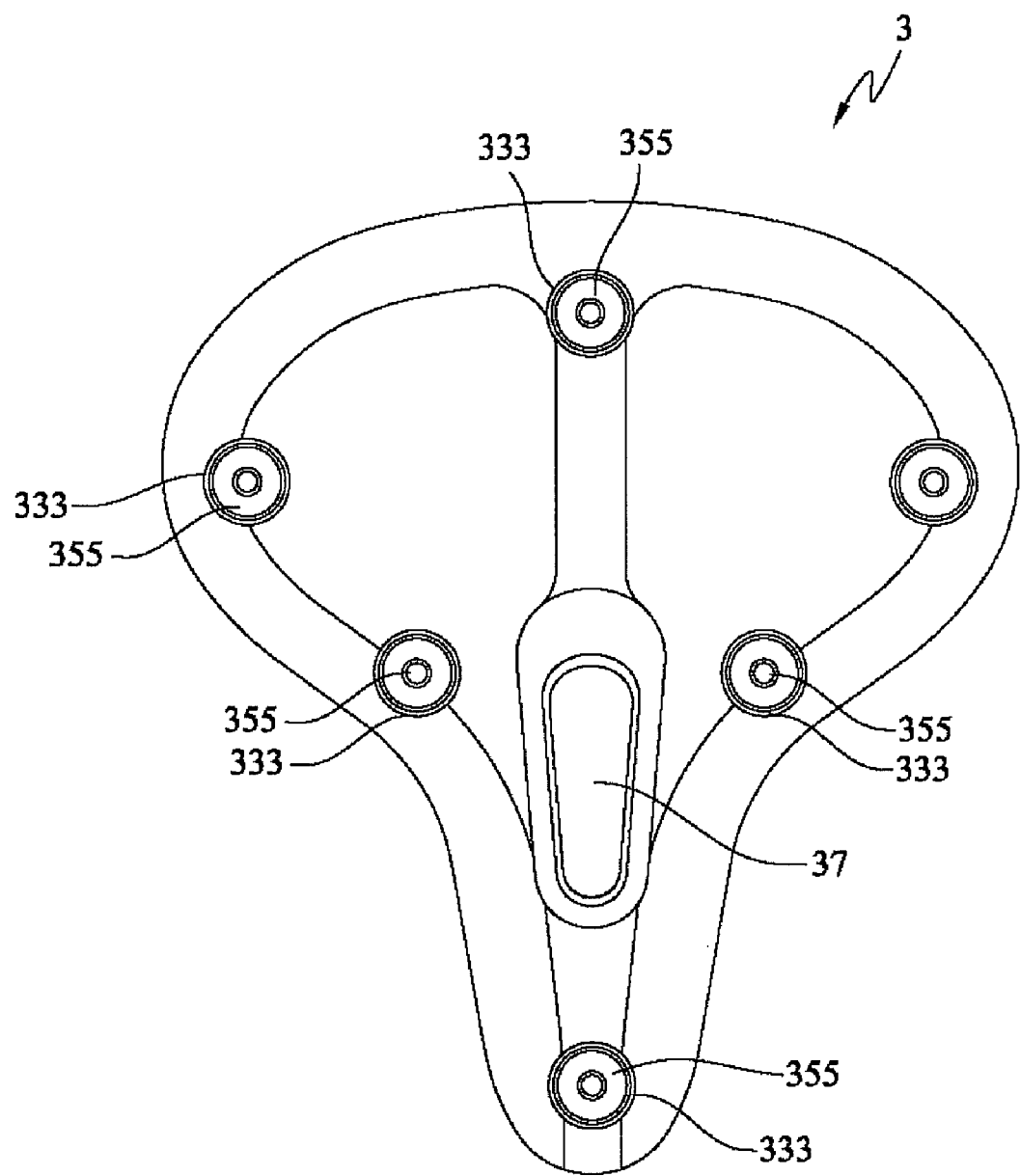
FIG. 3A is a top view of the third embodiment of this invention.
Figure 3B:
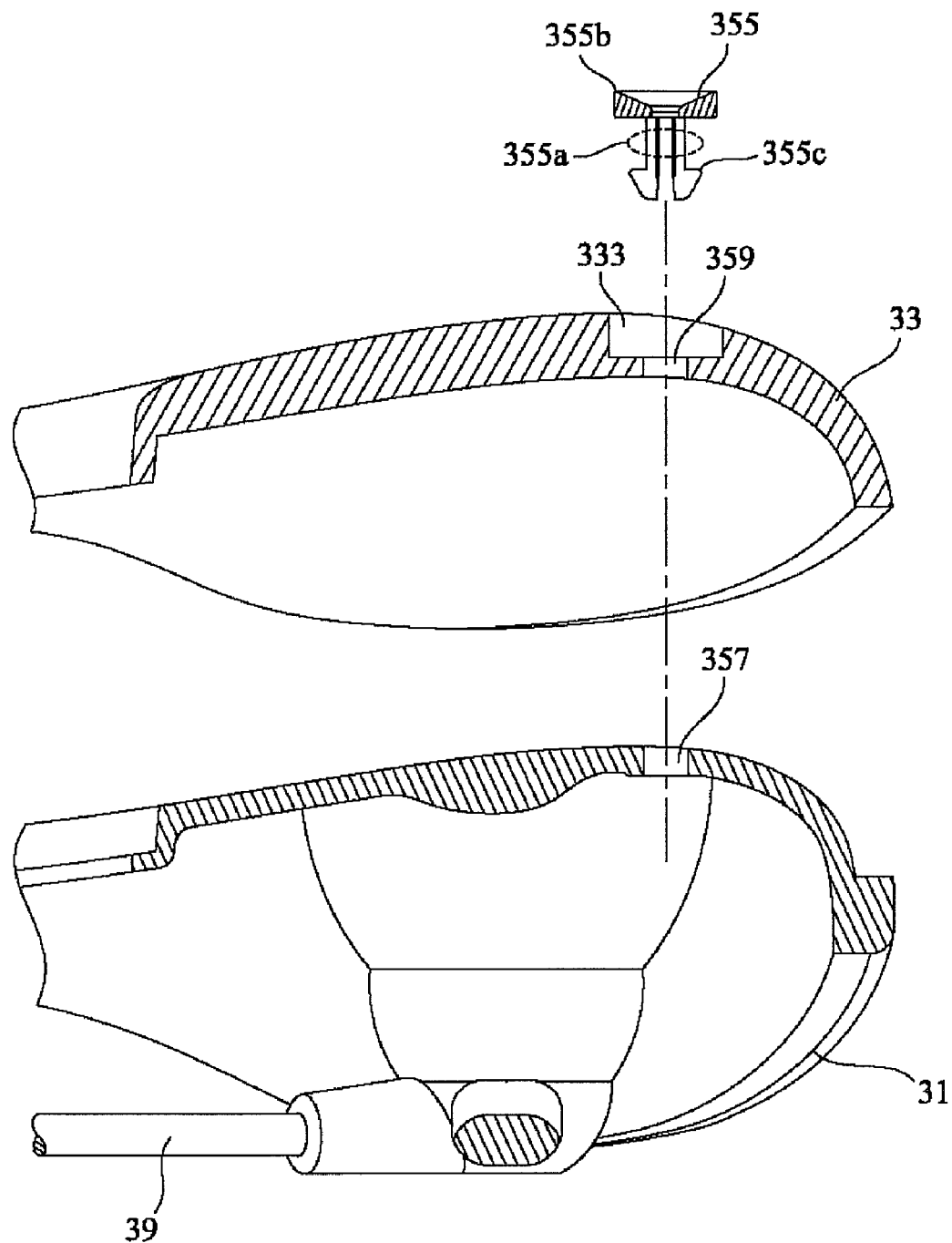
FIG. 3B is a partially cross-sectional exploded view of the third embodiment of this invention.
Figure 3C:
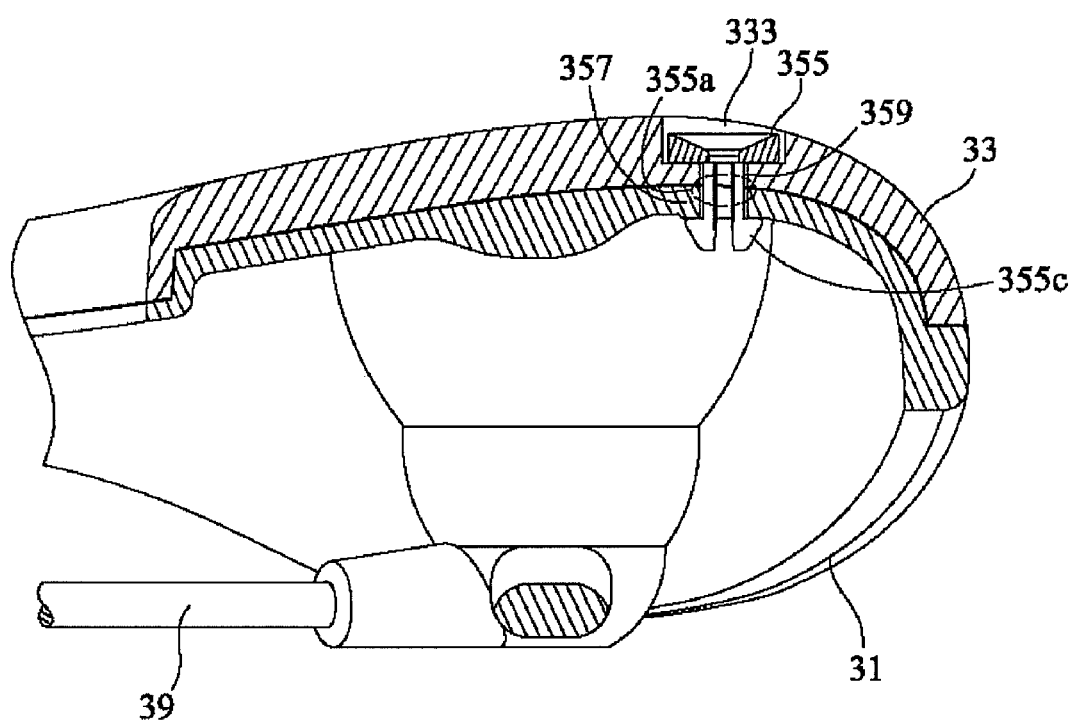
FIG. 3C is a partially cross-sectional assembled view of the third embodiment of this invention.

The third embodiment of this invention is a saddle 3, which is depicted in FIGS. 3A to 3C. The saddle 3 of this embodiment is similar to the saddle 2 of the second embodiment. In more detail, the base 31, the pad 33, the vent device 37, the rail device 39 and other parts of the saddle 3 are all the same as those of the saddle 2 of the second embodiment. However, the third embodiment is different from the second embodiment in that six cowl fasteners 355 are provided in the third embodiment. The pad 33 of the third embodiment also has six recesses 333 instead of three grooves on the top surface to accommodate the cap portions 355*b* or the discontinuous conical portions 355*c* of the cowl fasteners 355.

Accordingly, the base 31 comprises six first through-holes 357, while the pad 33 comprises six second through-holes 359 formed in the six recesses 333 respectively. In this embodiment, each of the recesses 333 has a depth greater than (in other embodiments, may also be equal to) the cap height of each of the cowl fasteners 355. Similar to the second embodiment, each of the cowl fasteners 355 of this embodiment is inserted through the first through-hole 357 and the second through-hole 359 from the positive direction. However, in other examples, each of the cowl fasteners 355 of this embodiment may also be inserted through the first through-hole 357 and the second through-hole 359 from the reverse direction, in which case, each of the recesses 331 has a depth greater than or equal to the discontinuous conical height of each of the cowl fasteners 355.

In other examples, the fastening device of this invention may also be in the form of various different fastening means such as threading, riveting, gluing, inserting or other means. In other words, any fastening means that is able to fix the EVA pad of this invention to the base can be applied to this invention. If the fastening means described in the first, the second or the third embodiments or even threading means are used in the saddle of this invention to fix the pad to the base, the pad can be detachably fixed to the base. Hence, when a dirty or worn pad needs to be replaced, or a pad of a different size or style is desired, or other situations requiring replacement of a pad arise, the pad may be detached from the base and replaced. This results in a greatly improved applicability and industrial competitiveness of the pad of this invention. Furthermore, the application of the saddle of this invention is not merely limited to bicycles, and the same concepts may also be applied to motorcycles, automobiles or other transportation vehicles.

The pad of the saddle of this invention is made of a material comprising the EVA, which is deformable in response to the different stress distribution to conform to the figure of the cyclist. When the cyclist sits on the saddle of this invention, the pad will experience an appropriate deformation under the action of the weight of the cyclist to conform to the shapes of the buttocks and crotches of the cyclist. On the other hand, this material can also absorb vibrations arising during the riding process, and provide an improved cushioning and supporting capabilities, thus remarkably improving comfort of the riding process.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A saddle, comprising:
   a base;
   a pad being made of a material comprising Ethylene-vinyl acetate; and
   a fastening device being adapted to connect the base with the pad;
   wherein the fastening device comprises a first through hole, a second through hole and a cowl fastener, the first through hole is formed in the base, the second through hole is formed in the pad, and the cowl fastener is inserted through the first through hole and the second through hole to clamp the base with the pad while a top surface of the pad further comprises a recess, the second through hole is formed in the recess, a depth of the recess is greater than or equal to a cap height or a discontinuous conical height of the cowl fastener.

2. The saddle as claimed in claim 1, wherein the cowl fastener comprises a neck portion, a cap portion and a discontinuous conical portion, when the base and the pad are clamped by the cowl fastener, a base portion of the cap portion abuts against the top surface of the pad, a support portion of the discontinuous conical portion abuts against a bottom surface of the base, and the neck portion is inserted through the first through hole and the second through hole.

3. The saddle as claimed in claim 1, wherein the cowl fastener comprises a neck portion, a cap portion and a discontinuous conical portion, when the base and the pad are clamped by the cowl fastener, a base portion of the cap portion abuts against a bottom surface of the base, a support portion of the discontinuous conical portion abuts against the top surface of the pad, and the neck portion is inserted through the first through hole and the second through hole.

4. The saddle as claimed in claim 1, wherein the fastening device comprises three first through holes, three second through holes and three cowl fasteners, the first through holes are formed in the base, the second through holes are formed in the pad, and the cowl fasteners are inserted through the first through holes and the second through holes respectively to clamp the base with the pad.

5. The saddle as claimed in claim 4, wherein a top surface of the pad further comprises three grooves, the second through holes are formed in the grooves, a depth of each of the grooves is greater than or equal to a cap height or a discontinuous conical height of the cowl fastener.

6. The saddle as claimed in claim 1, wherein the fastening device comprises six first through holes, six second through holes, and six cowl fasteners, the first through holes are formed in the base, the second through holes are formed in the pad, and the cowl fasteners are inserted through the first through hole and the second through hole respectively to clamp the base with the pad.

7. The saddle as claimed in claim 6, wherein the top surface of the pad comprises six recesses, the second through holes are formed in the recesses, a depth of each of the recesses is greater than or equal to a cap height or a discontinuous conical height of the cowl fasteners.

8. The saddle as claimed in claim 1, wherein the base comprises at least a first vent, extending from a top surface to a bottom surface of the base to guide air to flow from the bottom surface to the pad.

9. The saddle as claimed in claim 8, wherein the pad comprises at least a second vent corresponding to the first vent, extending from the top surface to a bottom surface of the pad to guide the air to flow from the bottom surface of the base to the top surface of the pad.

10. The saddle as claimed in claim 1, further comprising a rail device, disposed at a bottom surface of the base.

11. The saddle as claimed in claim 9, wherein the rail device is made of a material selected from the group consisting of magnesium, magnesium alloy, titanium, titanium alloy, nickel and nickel alloy thereof.

12. The saddle as claimed in claim 1, wherein the pad is made of the material comprising Ethylene-vinyl-acetate foam material.

13. The saddle as claimed in claim 1, wherein the fastening device is adapted to connect the base with the pad detachably.

* * * * *